United States Patent

[11] 3,621,096

| [72] | Inventors | Arthur J. Prange, Jr.<br>Chapel Hill;<br>Ian C. Wilson, Chapel Hill; Morris A. Lipton, Raleigh, all of N.C. |
|---|---|---|
| [21] | Appl. No. | 813,294 |
| [22] | Filed | Apr. 3, 1969 |
| [45] | Patented | Nov. 16, 1971 |
| [73] | Assignee | The University of North Carolina<br>Chapel Hill, N.C. |

[54] ANTIDEPRESSANT METHOD AND COMPOSITION FOR SAME COMPRISING A TRICYCLIC ANTIDEPRESSANT AND A THYROID HORMONE
7 Claims, No Drawings

[52] U.S. Cl. ................................................ 424/244, 424/319
[51] Int. Cl. ........................................................ A61k 27/00
[50] Field of Search ............................................ 424/244, 319

[56] References Cited
OTHER REFERENCES
Merck Index, 7th Ed., (1960), p. 1,066.
Grollman, Pharmacology & Therapeutics, 6th Ed., (1965), pp. 274– 275.

*Primary Examiner*—Stanley J. Friedman
*Attorney*—Wenderoth, Lind & Ponack

ABSTRACT: The antidepressant action of tricyclic antidepressants is enhanced by concurrent administration of thyroid hormone. A composition for treating depression comprises a tricyclic antidepressant and a thyroid hormone in pharmaceutically effective amounts admixed with a pharmaceutical carrier.

ANTIDEPRESSANT METHOD AND COMPOSITION FOR SAME COMPRISING A TRICYCLIC ANTIDEPRESSANT AND A THYROID HORMONE

The present invention is concerned with mental depression and the treatment thereof. More specifically there is provided a novel method for the treatment of mental depression using a combination of pharmaceutically effective materials. The invention also provides a composition for use in the treatment of depression.

A tremendous amount of research effort has been invested in recent years in the study of mental depression and to methods for its treatment. Much of this effort has gone into the discovery of the biological causes of depression and to chemical substances which might be utilized in a system of therapy related to these biological causes. While a large number of drugs are now available which will ameliorate depression and while a great deal of investigation has been conducted with these drugs, to a great extent the knowledge concerning biological causes of depression remains incomplete. Also, the drugs presently available suffer from various disadvantages and are not optimum. In this latter respect there can be mentioned relatively slow onset of action. This is especially critical since the omnipresent danger of suicide in depression makes speed of treatment a prime consideration. It has recently been pointed out that the conquest of general paresis has left suicide virtually the sole cause of death from mental illness.

The present invention provides a method for the treatment of depression constituting an advance over previously employed methods. According to this method a combination of pharmaceutically effective substances is administered to a patient suffering from depression. The substances administered are (1) a tricyclic antidepressant drug and (2) a thyroid hormone.

The tricyclic antidepressant drugs are well known to the art and are illustrated by those such as imipramine (5-(3-dimethylaminopropyl)-10,11-dihydro-5H-dibenz [b,f]azepine hydrochloride), desmethylimipramine (5-(3-methylaminopropyl)-10,11-dihydro-5H-[b,f]azepine, protriptyline (5-(3-methylaminopropyl)-dibenzo[a,d]cyclohepta-[1,4,6]triene), amitriptyline (5-(3-dimethylaminopropylidene)-dibenzo [a.d.]cyclohepta[1,4]diene), and nortriptyline-(5-(3-methylaminopropylidene)-dibenzo[a,d]cyclohepta[]-diene), and the like. As indicated these tricyclic antidepressants are well known to the art skilled and have been previously employed in the treatment of mental depression. Preferred among these tricyclics for purposes of this invention are imipramine and amitriptyline. For purposes of this invention the tricyclic drugs may be employed as the base or as a salt with an organic or inorganic acid.

The thyroid hormone which is employed may be of natural or synthetic origin. Such materials are known to the art and are conventionally used in treating hypothyroidism. Illustrative of the thyroid hormones are L-triiodothyronine (β-[4-hydroxy-3-iodophenoxy)-3,5-diiodophenyl]alanine) and L-tetraiodothyronine (β[4-hydroxy-3,5-diiodophenoxy)-3,5-diiodophenyl]alanine). These materials are also referred to as T3 and T4 respectively. The sodium salts of the materials are available commercially.

In carrying out the method of the invention, depressed patients are given the combination of substances at pharmaceutically effective dosage levels. The substances are administered in the form of a single dosage unit in which the active ingredients are combined with a suitable carrier; or they may be given in separate dosage units in which the active materials are individually combined with a suitable carrier. When administered separately, the administration may be simultaneous or at selected time intervals.

The administration is preferably peroral and the carrier or carriers are selected with this in mind. While this is the case, other modes of administration of both substances as well as mixed modes with the individual materials is not precluded.

The dosage levels of the materials will vary with the particular material being used and the severity of the condition of the patient being treated. The tricyclic antidepressant is used in amounts ranging from those conventionally employed in treating depression to amounts somewhat lower. In general the amount will be from about 75 to about 250 mg. per day, and more specifically in amounts of about 100 to 200 mg. per day. Illustrative of a dosage in accordance with this invention is 150 mg. of tricyclic antidepressant in the form of two 25 mg. capsules, tid.

The thyroid hormone is administered at levels sufficient to enhance the activity of the tricyclic antidepressant which is employed. This amount will vary with the patient and the severity of the condition. Illustrative of the invention is T3 or T4 administered in a daily dosage of 15 to 50 μg, with a dosage of about 20 to 30 μg. being preferred.

The pharmaceutical compositions of the invention are prepared by utilizing the active ingredients in association with the pharmaceutical carriers conventionally employed with such materials.

The compositions of the present invention are in general contemplated for administration orally to achieve an antidepressant effect. This may be in any of the dosage forms such as tablets, capsules, powders, suspensions, solutions, syrups and the like, including sustained release preparations. The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the active substances to a suitably fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the active substance, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet-forming dies by means of the addition of stearic acid, a stearate salt, talc or mineral oil. The lubricated mixture is then compressed into tablets. The medicaments can also be combined with free-flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a nontoxic alcoholic vehicle. Suspensions can be formulated by dispersing the medicaments in a nontoxic vehicle in which it is insoluble.

One important embodiment of the present invention, particularly for preparing solid pharmaceutical formulations, is the pharmaceutically acceptable nontoxic acid addition salts of the tricyclic drugs. Such pharmaceutically acceptable nontoxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic, enenthic and the like acids.

While the present invention contemplates, primarily, peroral administration, other modes are certainly not excluded. Ampuls for parenteral application can be prepared and preferably contain water soluble salts of the active substances and possible buffer substances in aqueous solution.

In liquid compositions, whether designed for peroral or parenteral administration in which the active substances are combined, care must be taken to insure stability of the active materials.

In cases where the active materials are to be administered separately, individual compositions are prepared in the manner indicated above. These individual compositions can then be administered as such or combined into a single-dosage unit while maintaining the separate identity, as for example in a multilayer tablet or single capsule containing both components in a plurality of discrete particles.

The following exemplary data are set forth in order to illustrate the invention and should not be taken to be exhaustive thereof. It will be apparent to persons skilled in the art that various modifications can be made without departing from the scope of the invention.

A group of 20 primarily depressed patients admitted to a state mental institution were employed in this study. After exclusion of thyroid and cardiovascular disease detectable by usual historial, physical and laboratory examination, each depressed patient was assigned to one of two treatment plans according to a prearranged, randomized schedule. All initial differences between the two treatment groups were statistically insignificant (p. > 1.). In this regard see table I. All patients were free of psychotropic drugs for at least one week before entering the study. The patients were weighed and their height and transverse chest diameter measured.

On the day before beginning drug treatment each patient received the following: Self-Rating Scale for Depression (SDS) [Zung, W. W. K: A self-rating Depression Scale, Arch. Gen. Psychiat., 12:63, 1965]; Hamilton Rating Scale for Depression (HRS) [Hamilton, M: A Rating Scale for Depression, J. Neurol. Neurosurg. Psychiat., 23:56–62, 1960]; Inpatient Multidimensional Psychiatric Scale (IMPS) [Lorr, M., Kleet, C. J. and McNair, DM: Syndromes of Psychosis, MacMillan and Company, New York, 1963]. These SDS and HRS measurements were repeated thrice weekly throughout the course of the study. One investigator, experienced with the measures but not informed of medication and having no other connection with the study performed all ratings.

On day 1 and thereafter all patients received 150 mg. of imipramine in the form of two 25 mg. capsules, tid. Beginning on day 5, half the patients, according to schedule, in addition received daily one capsule containing T3 25µg., and half received daily a capsule containing inert placebo (P). All three capsules (imipramine, T3 and P) were identical in appearance. During the course of the study no other drugs were administered. All patients were housed in the same admission ward of the hospital. Psychotherapy, aside from that implied by routine care, was not used.

RESULTS

The first dose of T3 or P was given early on day 5. Several T3 patients, but no P patients, were remarkably improved 8 hours later when psychometric testing was performed. The difference between groups increased steadily and became statistically significant on HRS on day 9 and on SDS on day 12.

As a criterion of definitive outcome, there was chosen the time required for a patient to achieve (and subsequently not to exceed) an HRS score of 8, which roughly corresponds to his being ready for discharge on clinical grounds. T3 patients attained this criteria in 17.4 days (S.D $\pm$ 9.7); P patients in 24.8 days ($\pm$6.2). These differences are statistically significant (P <0.05, Mann-Witney U test).

Four P patients were declared clinical failures in the 5th or 6th week after beginning treatment. Three were given T3, 25 µg. daily and all showed quick remission within one week. The fourth responded well, though slowly, to electric shock treatment. No T3 patients were finally declared failures, although three had not obtained full remission by day 28. Three other T3 patients obtained full and lasting remission before day 9. Two of these and one other T3 patient were discharged between day 19 and day 28, having demanded discharge. Six months after conclusion of the study two P patients had been readmitted for depression but no T3 patients, although they received no T3 after leaving the hospital.

Suicidal tendencies were greatly diminished by the use of T3. (HRS Subscale).

In order to determine whether the conjoint use of T3 might produce certain symptoms while removing others, a drug toxicity inventory was utilized. This was in accordance with Sandifer, M. G. Wilson, I. C. and Gambill, J. M.: The Influence of Case Selection and Dosage in Antidepressant Drug Trial, Brit. J. Psychiat., 111: No. 471, 142–148, 1965. At no time was there a significant difference between scores of the two groups. Side effects were equally infrequent and limited mainly to the usual side effects of imipramine (dry mouth and metallic taste). All patients experienced fewer side effects than those in previous studies who had received 200–300 mg. imipramine daily.

TABLE I.—INITIAL CHARACTERISTICS OF TREATMENT GROUPS[1]

| | Biological measures | | | IMPS subscales relevant to depression | | | |
|---|---|---|---|---|---|---|---|
| | Age | Men | Women | Excitement | Hostility | Intrapunitive | Retardation |
| Imipramine plus Placebo | 45.4 ($\pm$9.4) | 1 | 9 | 1.0 ($\pm$1.3) | 6.3 ($\pm$5.0) | 44.0 ($\pm$5.6) | 35.3 ($\pm$4.8) |
| Imipramine plus T3 | 41.7 ($\pm$10.6) | 3 | 7 | 1.9 ($\pm$2.3) | 7.3 ($\pm$4.9) | 43.6 ($\pm$5.0) | 35.9 ($\pm$6.1) |

[1] Means and standard deviations.

The study results previously set forth make it clear that the use of thyroid hormone in conjunction with the tricyclic antidepressant enhances the activity of the antidepressant. The specific biological mechanism by which the thyroid hormone acts to enhance the antidepressant activity is not entirely clear. It is clear, however, that the conjoint use of the materials is superior to the use of the antidepressant alone.

Results substantially similar to those set forth above are obtained when utilizing a composition in which imipramine and L-triiodothyronine are combined in a single dosage unit with a solid perorally acceptable pharmaceutical carrier.

The following provides an illustrative example of the preperation of a peroral dosage unit of the present invention.

CAPSULES

A powder is prepared by comminuting a mixture of 500 g. of imipramine and 0.1 g. of L-triiodothyronine to a suitably fine size. Magnesium stearate in the amount of 15 g. is added as a lubricant and the entire batch thoroughly mixed. Capsules are prepared from the resulting powdered mixture by filling into gelatin sheaths. The resulting peroral dosage unit contains 50 mg. of imipramine and 10 μg. of L-triiodothyronine and is administered to patients suffering from mental depression in accordance with this invention.

TABLETS

Tablets are prepared by carefully admixing a comminuted mixture of 500 g. imipramine, 0.1 g. of L-triiodothyronine and 400 g. of lactose. This mixture is granulated with 1 percent solution of carboxymethyl cellulose, dried and sized in the usual manner. To the dried granulation is added 50 g. of corn starch and 9.5 g. of magnesium stearate. Tablets to contain 50 mg. of imipramine and 10 μg. of L-triiodothyronine are compressed in the usual manner. Coatings may then be applied to the compressed tablets according to any of several procedures known to the art if so desired.

What we claim is:

1. A method for the treatment of mentally depressed patients which comprises perorally administering to a patient suffering from mental depression from about 75 mg. to about 250 mg. daily of a tricyclic antidepressant selected from the group consisting of imipramine and desmethylimipramine and about 15 μg. to about 50 μg. daily of a thyroid hormone selected from the group consisting of the group L-triiodothyronine and L-tetraiodothyronine.

2. A method as in claim 1 wherein the tricyclic antidepressant is imipramine.

3. A method as in claim 1 wherein the thyroid hormone is L-triiodothyronine.

4. A method as in claim 2 wherein the thyroid hormone is L-triiodothyronine.

5. A peroral composition for the treatment of mental depression which comprises an antidepressant effective amount of a mixture of a tricyclic antidepressant selected from the group consisting of imipramine and desmethylimipramine, and a thyroid hormone selected from the group consisting of L-triiodothyronine and L-tetraiodothyronine in admixture with a perorally acceptable pharmaceutical carrier, the ratio of active constituents being about 75–250 mg. tricyclic antidepressant to about 15–50 μg. hormone.

6. A composition as in claim 5 in peroral dosage unit form wherein the tricyclic antidepressant is present in an amount sufficient to give a daily dosage of from about 75 to 250 mg. when administered according to a desired daily dosage regimen and the thyroid hormone is present in an amount sufficient to give a daily dosage of from 15 to about 50 μg. when administered according to a desired daily dosage regimen.

7. A composition in dosage unit form for use in treating mental depression which comprises from about 20 to about 50 mg. of imipramine, about 5 to about 10 μg. of L-triiodothyronine and a solid perorally acceptable pharmaceutical carrier.

* * * * *

UNITED STATES PATENT OFFICE
CERTIFICATE OF CORRECTION

Patent No. 3,621,096      Dated November 16, 1971

Inventor(s) ARTHUR J. PRANGE, JR. ET AL.

It is certified that error appears in the above-identified patent and that said Letters Patent are hereby corrected as shown below:

Column 1, immediately following the title, insert the following:

> The invention described herein was made in the course of work under a grant or award from the Department of Health, Education and Welfare.

Signed and sealed this 11th day of July 1972.

(SEAL)
Attest:

EDWARD M. FLETCHER, JR.
Attesting Officer

ROBERT GOTTSCHALK
Commissioner of Patents